United States Patent
Millett (10) Patent No.: US 8,032,495 B2
(45) Date of Patent: Oct. 4, 2011

(54) INDEX COMPRESSION

(75) Inventor: Ronald P. Millett, Orem, UT (US)

(73) Assignee: Perfect Search Corporation, Provo, UT (US)

( * ) Notice: Subject to any disclaimer, the term of this patent is extended or adjusted under 35 U.S.C. 154(b) by 638 days.

(21) Appl. No.: 12/143,432

(22) Filed: Jun. 20, 2008

(65) Prior Publication Data
US 2009/0319549 A1   Dec. 24, 2009

(51) Int. Cl.
*G06F 7/00* (2006.01)
(52) U.S. Cl. ........ 707/681; 707/800; 711/170; 711/171; 711/172; 711/173
(58) Field of Classification Search .................. 707/681, 707/800; 711/170–173
See application file for complete search history.

(56) References Cited

U.S. PATENT DOCUMENTS

| | | | |
|---|---|---|---|
| 4,961,139 A | 10/1990 | Hong et al. | |
| 5,530,854 A | 6/1996 | Emery et al. | |
| 5,590,716 A | 1/1997 | Mansfield | |
| 5,664,179 A | 9/1997 | Tucker | |
| 5,699,441 A | 12/1997 | Sagawa | |
| 5,701,459 A | 12/1997 | Millett | |
| 5,737,734 A | 4/1998 | Schultz | |
| 5,740,445 A | 4/1998 | Okuda | |
| 5,761,652 A | 6/1998 | Wu | |
| 5,799,312 A | 8/1998 | Rigoutsos | |
| 5,850,565 A * | 12/1998 | Wightman ........................ 710/1 |
| 6,018,733 A | 1/2000 | Kirsch et al. | |
| 6,026,398 A | 2/2000 | Brown | |
| 6,076,051 A | 6/2000 | Messerly | |
| 6,128,613 A | 10/2000 | Wong et al. | |
| 6,216,123 B1 | 4/2001 | Robertson et al. | |
| 6,233,571 B1 | 5/2001 | Egger et al. | |
| 6,253,188 B1 | 6/2001 | Witek | |
| 6,473,729 B1 | 10/2002 | Gastaldo et al. | |
| 6,584,458 B1 | 6/2003 | Millett et al. | |
| 6,584,465 B1 | 6/2003 | Zhu | |

(Continued)

FOREIGN PATENT DOCUMENTS

WO   WO 2007082212 A2   7/2007

(Continued)

OTHER PUBLICATIONS

U.S. Appl. No. 11/328,863, filed Jan. 10, 2006, Millett.

(Continued)

*Primary Examiner* — Etienne Leroux
*Assistant Examiner* — Cindy Nguyen
(74) *Attorney, Agent, or Firm* — Workman Nydegger (57) ABSTRACT

Compressing and decompressing compressed index lists. One or more index lists include at least a portion of the list that is compressed. A method includes reading an entry from a list. The method further includes determining that the entry indicates the start of a compressed block of the list. The compressed block is compressed using a compression algorithm including a plurality of delta pointers. Each of the delta pointers point to data store entries by reference to a difference from a reference in a previous entry in the list. An entry size indicator is referenced. The entry size indicator is configured to indicate a memory storage size for a delta pointer, and the entry size indicator supports indications for all of fixed storage sizes, variable storage sizes, and run length encoding. The compressed block of the list is decompressed according to the entry size indicator.

17 Claims, 6 Drawing Sheets

U.S. PATENT DOCUMENTS

| | | |
|---|---|---|
| 6,658,626 B1 | 12/2003 | Aiken |
| 6,678,686 B1 | 1/2004 | Patel |
| 6,718,325 B1 | 4/2004 | Chandra |
| 6,748,401 B2 | 6/2004 | Blackburn |
| 6,772,141 B1 | 8/2004 | Pratt |
| 6,778,981 B2 | 8/2004 | Lee |
| 6,785,677 B1 | 8/2004 | Fritchman |
| 6,804,664 B1 | 10/2004 | Hartman et al. |
| 6,947,931 B1 | 9/2005 | Bass et al. |
| 6,985,904 B1 | 1/2006 | Kaluskar et al. |
| 6,993,533 B1 | 1/2006 | Barnes |
| 7,139,753 B2 | 11/2006 | Bass et al. |
| 7,181,438 B1 | 2/2007 | Szabo |
| 7,266,553 B1 | 9/2007 | Anderson et al. |
| 7,590,716 B2 | 9/2009 | Sinclair |
| 7,640,363 B2 | 12/2009 | Teodosiu |
| 2001/0050682 A1* | 12/2001 | Deering et al. .............. 345/420 |
| 2002/0099536 A1 | 7/2002 | Bordner et al. |
| 2002/0099685 A1 | 7/2002 | Takano |
| 2002/0103799 A1 | 8/2002 | Bradford |
| 2003/0074341 A1 | 4/2003 | Blackburn et al. |
| 2003/0097356 A1 | 5/2003 | Lee et al. |
| 2003/0191737 A1 | 10/2003 | Steele |
| 2004/0225497 A1 | 11/2004 | Callahan |
| 2004/0225643 A1 | 11/2004 | Alpha et al. |
| 2004/0260694 A1 | 12/2004 | Chaudhuri et al. |
| 2005/0108230 A1 | 5/2005 | Carroll |
| 2005/0108394 A1 | 5/2005 | Braun et al. |
| 2005/0114298 A1 | 5/2005 | Fan et al. |
| 2005/0131872 A1 | 6/2005 | Calbucci et al. |
| 2005/0171926 A1 | 8/2005 | Thione |
| 2005/0281469 A1* | 12/2005 | Anderson et al. ............ 382/232 |
| 2005/0283468 A1 | 12/2005 | Kamvar |
| 2006/0004740 A1 | 1/2006 | Dettinger |
| 2006/0036649 A1 | 2/2006 | Simske et al. |
| 2006/0080361 A1 | 4/2006 | Suzuki |
| 2006/0106793 A1 | 5/2006 | Liang |
| 2006/0126916 A1 | 6/2006 | Kokumai |
| 2006/0195672 A1 | 8/2006 | Inoue |
| 2006/0212420 A1 | 9/2006 | Murthy |
| 2006/0235843 A1 | 10/2006 | Musgrove et al. |
| 2006/0265396 A1 | 11/2006 | Raman |
| 2007/0027864 A1 | 2/2007 | Collins et al. |
| 2007/0033165 A1 | 2/2007 | Sheinwald et al. |
| 2007/0073894 A1 | 3/2007 | Erickson et al. |
| 2007/0088686 A1 | 4/2007 | Hurst-Hiller |
| 2007/0106876 A1 | 5/2007 | Goswami |
| 2007/0156677 A1 | 7/2007 | Szabo |
| 2007/0162481 A1 | 7/2007 | Millett |
| 2007/0175674 A1 | 8/2007 | Brinson |
| 2007/0203898 A1 | 8/2007 | Carmona |
| 2007/0250494 A1 | 10/2007 | Peoples et al. |
| 2008/0018794 A1* | 1/2008 | Fung .............................. 348/612 |
| 2008/0154938 A1 | 6/2008 | Cheslow |
| 2009/0019038 A1 | 1/2009 | Millett |

FOREIGN PATENT DOCUMENTS

| | | |
|---|---|---|
| WO | WO 2007103815 A2 | 9/2007 |

OTHER PUBLICATIONS

U.S. Appl. No. 60/779,214, filed Mar. 3, 2006, Millett.
U.S. Appl. No. 11/681,673, filed Mar. 2, 2007, Millett.
U.S. Appl. No. 11/847,688, filed Aug. 30, 2007, Millett.
U.S. Appl. No. 11/847,784, filed Aug. 30, 2007, Millett.
U.S. Appl. No. 11/847,869, filed Aug. 30, 2007, Millett.
U.S. Appl. No. 12/143,441, filed Jun. 20, 2008, Millett.
Manning, Christopher D. and Schutze, Hinrich Foundations of Statistical Natural Language Processing, The MIT Press, Cambridge Massachusetts, May 1999 (pp. 151, 158, 192-194, 377 and 532).
Mitra, Mandar et al. "An Analysis of Statistical and Syntactic Phrases", Jun. 1997.
Possas, Bruno et al. "Set-Based Vector Model: An Efficient Approach for Correlation-Based Ranking", Oct. 2005.
Office Action mailed Feb. 20, 2008 cited in related case U.S. Appl. No. 11/328,863.
Ceglowski, Maciej "Using Bloom Filters", Apr. 8, 2004, http://www.perl.com/pub/a/2004/04/08/bloom_filters.html, 4 pages.
Office Action dated Dec. 29, 2008 cited in U.S. Appl. No. 11/681,673.
Notice of Allowance mailed in U.S. Appl. No. 11/681,673, Oct. 5, 2009.
Office Action dated Nov. 27, 2009 cited in U.S. Appl. No. 11/847,688.
Office Action dated Jan. 8, 2010 cited in U.S. Appl. No. 11/847,869.
Office Action dated Mar. 4, 2010 cited in U.S. Appl. No. 11/847,784.
U.S. Appl. No. 12/143,441, Mail Date May 12, 2010, Office Action.
Roblee, Chris, "Hierarchical Bloom Filters: Accelerating Flow Queries and Analysis", Lawrence Livermore National Laboratory FloCon 2008, dated Jan. 8, 2008.
U.S. Appl. No. 11/847,688, Mail Date Apr. 1, 2010, Notice of Allowance.
U.S. Appl. No. 13/052,399, filed Mar. 21, 2011, Millett.
U.S. Appl. No. 11/847,784, Mail Date Aug. 19, 2010, Office Action.
U.S. Appl. No. 12/211,713, Mail Date Sep. 16, 2008, Office Action.
U.S. Appl. No. 11/847,869, Mail Date May 13, 2010, Notice of Allowance.
U.S. Appl. No. 12/143,441, Mail Date Dec. 14, 2010, Notice of Allowance.
U.S. Appl. No. 12/211,713, Mail Date Jan. 12, 2011, Office Action.

* cited by examiner

| Offset | Data Store Records |
|---|---|
| 0000000000 | 1, 3, 5, 7, 9, 11, 13, 15 |
| 0000000001 | 17, 19, 21, 23, 25, 27, 31 |
| ... | ... |
| 1001101111 | 9,969, 9,971, 9,973, 9,975, 9,977, 9,979, 9,981, 9,983 |
| 1001110000 | 9,985, 9,987, 9,989, 9,991, 9,993, 9,995, 9,997, 9,999, |

FIG. 2

| 0 | 1 | 2 | 3 | 4 | 5 | 6 | 7 | 8 | 9 | a | B | C | D | E | F | 10 | 11 | 12 | 13 | 14 | 15 | 16 | 17 | 18 | 19 | 1a | 1b | 1c | 1d | 1e | 1f |
|---|---|---|---|---|---|---|---|---|---|---|---|---|---|---|---|----|----|----|----|----|----|----|----|----|----|----|----|----|----|----|----|
| 0 | 0 | 0 | 1 | 0 | 1 | 0 | 0 | 0 | 1 | 0 | 0 | 0 | 1 | 0 | 1 | 0  | 0  | 0  | 0  | 0  | 1  | 1  | 0  | 1  | 0  | 0  | 0  | 1  | 0  | 0  | 1  |

302

304
306

|  |  |  | Hash | Last 8 Bits Of Hash | Last 5 Bits Of Hash | Hex Of Last 5 Bits |
|---|---|---|---|---|---|---|
|  |  | fox | 40b8636cf497235c | 01011100 | 11100 | 1C |
|  | red |  | 100519ba181728d8 | 11011000 | 11000 | 18 |
|  | red | fox | f9d6824a13b3ed25 | 00100101 | 00101 | 5 |
| quick |  |  | b249f6d0e2e948fc | 11111100 | 11100 | 1C |
| quick |  | fox | ec45e8c4c06bed36 | 00110110 | 10110 | 16 |
| quick | red |  | b0cc990de2fd626d | 01101101 | 01101 | D |
| quick | red | fox | 1c1539fdf2306635 | 00110101 | 10101 | 15 |
| The |  |  | 1a6a89be20908b63 | 01100011 | 00011 | 3 |
| The |  | fox | 679e70ee245a112d | 00101101 | 01101 | D |
| The |  | fox | 0ffc178518170f60df | 11011111 | 11111 | 1F |
| The |  | fox | 56cf1314b42ff1d1 | 11010001 | 10001 | 11 |
| The | quick |  | 00bf1348c0e06f58 | 01011000 | 11000 | 18 |
| The | quick |  | 272dc1de87ccca95 | 10010101 | 10101 | 15 |
| The | quick | red | fe417685c0f445c9 | 11001001 | 01001 | 9 |
| The | quick | red | e6305123b5974196 | 10010110 | 10110 | 16 |

FIG. 6

INDEX COMPRESSION

BACKGROUND

Background and Relevant Art

Computers and computing systems have affected nearly every aspect of modern living. Computers are generally involved in work, recreation, healthcare, transportation, entertainment, household management, etc.

Computers may be used to implement searching functionality. For example, search engines may be used to find records in a computer implemented data store. Typically, search engines use an index to find records in a data store. Data stores may include repositories such as databases, stored flat files, compilations of data including email storage, contact storage, or other personal information management (PIM) storage, or compilations of data including large portions of the Internet or data stored on intranets. The index may index various parameter patterns that appear in the data store. For example, the index may include an entry for the parameter pattern "fox" which includes a list of all of the records in the data store that include the term "fox" in them. The index may be optimized for applications by balancing constraints including storage space requirements, speed requirements, index coverage requirements, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method that may be practiced in a computing environment including one or more index lists. At least one of the one or more index lists includes at least a portion of the list that is compressed. The method includes acts for reading portions of a compressed index list. The method includes reading an entry from a list. The method further includes determining that the entry indicates the start of a compressed block of the list. The compressed block is compressed using a compression algorithm referred to herein as a delta compression algorithm including a plurality of delta pointers. Each of the delta pointers point to data store entries by reference to a difference from a reference in a previous entry in the list. An entry size indicator is referenced. The entry size indicator is configured to indicate a memory storage size for a delta pointer, and the entry size indicator supports indications for all of fixed storage sizes, variable storage sizes, and run length encoding options. The compressed block of the list is decompressed according to the entry size indicator.

Another method may be practiced in a computing environment including one or more index lists. At least one of the one or more index lists includes at least a portion of the list that is compressed. The method includes acts for reading portions of a compressed index list. The method includes reading an entry from a list. A determination is made that the entry indicates the start of a compressed block of the list. The compressed block is compressed using a compression algorithm where the compressed block includes a number of delta pointers. Each of the delta pointers point to data store entries by reference to a difference from a reference in a previous entry in the list. The method further includes referencing a portion of a differential indicator. The differential indicator is divided into a number of portions. At least some of the portions each correspond to a compressed entry in the compressed block. Each of the portions indicates a memory size of a compressed entry. A compressed entry is decompressed by reading a memory entry of the indicated memory size of the compressed entry. The acts of referencing a portion of a differential indicator and decompressing a compressed entry are repeated for subsequent portions and subsequent corresponding compressed entries.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates an abbreviated index indexing hash keys of parameter patterns;

DETAILED DESCRIPTION

Some embodiments described herein are directed to using data structures to perform data compression. In particular, some embodiments are directed to using delta compression techniques for index lists.

Figure 1A:
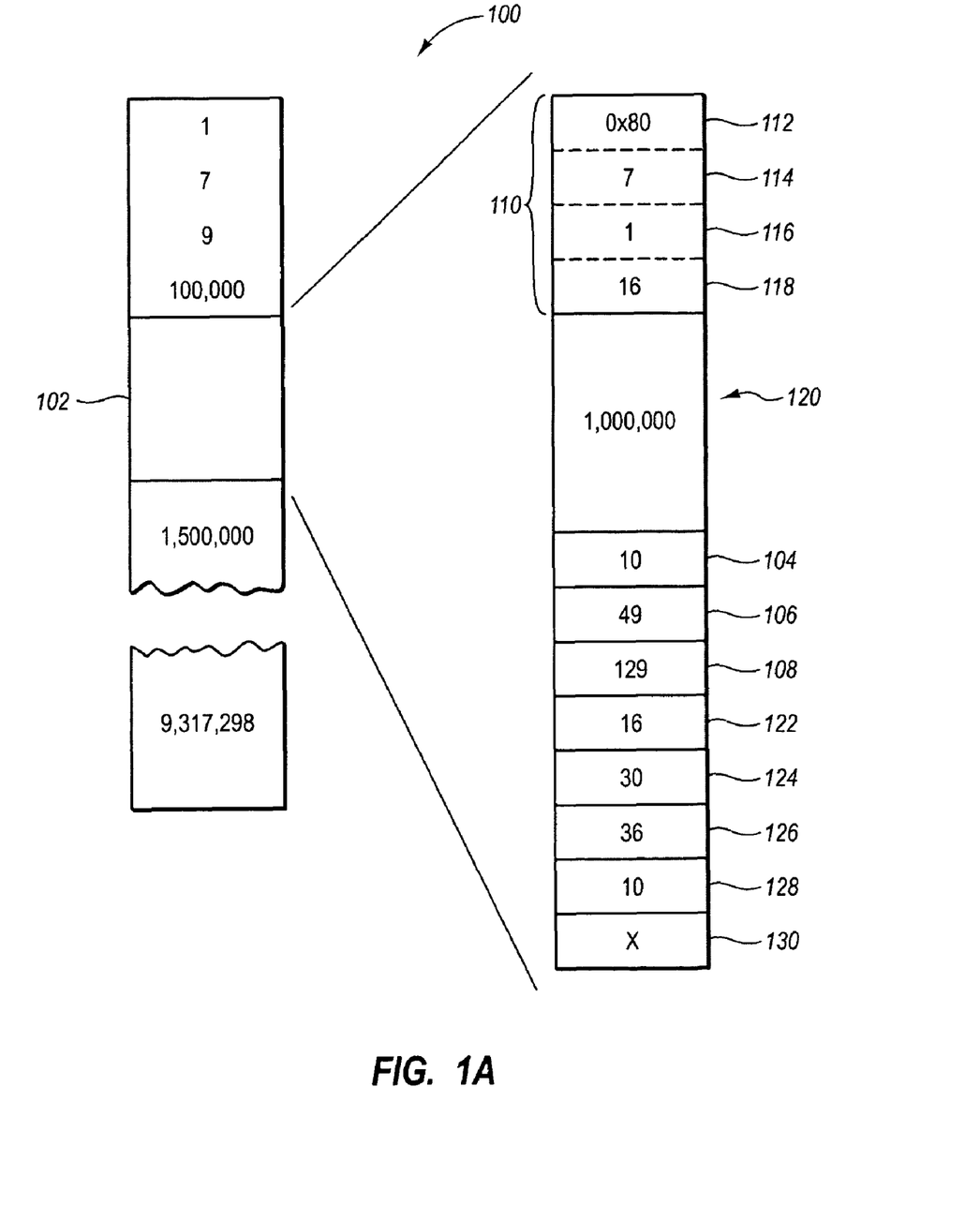
FIG. 1A illustrates an index entry including a compressed portion of the index entry.

Referring now to FIG. 1A, an example list is illustrated. The list 100 includes a list of numbers that represent data store records in this particular example. For example, the list 100 may represent an index entry for a parameter pattern where the index indexes some data store. For example, the index list 100 may include a list of all record numbers in the data store which include the parameter pattern "fox" in a data store. Thus the list 100 can be used to find all records in the data store which include the word "fox". In the illustrated example, the list 100 includes a number of location numbers to records. For example, the numbers 1, 7, 9, 100,000, 1,500,000, and 9,317,298 are location numbers to data store records. The location numbers may represent the memory address, or a direct mapping to the memory address of the record containing the parameter pattern indexed by the list 100. Alternatively, the location numbers may represent other data store address representations. In particular, it should be noted that the above example, and following description, is a highly specific implementation and is not intended to limit the scope of the embodiments that may be practiced within the scope of the invention. For the element described above, various pointers and representations may be used where the invention still applies. For example, consider a hypothetical system able to point based on one or more of color, touch, smell, sound, keyword, or any other pointer. Such systems could be implemented within the scope of the invention as disclosed herein.

The list 100 also includes a compressed portion 102. The compressed portion includes pointers to data store records but in a format such that in the aggregate the pointers have been compressed to save storage space as it relates to an index including the list 100. In the example illustrated in FIG. 1A each of the location numbers requires four binary bytes of data (i.e. 32 bits) to represent a pointer to a record in a data store. The compressed portion 102 uses compression techniques to reduce the aggregate number of bytes required for each entry in the list 100 by substantially reducing the number of bytes required for some of the individual entries in the compressed portion.

The compressed portion 102 uses delta compression to compress the compressed portion 102 of the list. Delta compression stores numerical distances between pointers for some of the pointers as opposed to a more direct representation of a pointer. In the example illustrated in FIG. 1A, record number 1,000,000 may be an entry included in the compressed portion 102 of the list 100. A first compressed entry delta pointer 104 is a delta pointer which adds 10 to 1,000,000 and thus represents a pointer to record number 1,000,010. A second compressed entry delta pointer 106 adds 49 to 1,000,010 such that the second compressed entry delta pointer 106 points to record number 1,000,059. The third compressed entry delta pointer 108 adds 129 to 1,000,059 and thus points to record number 1,000,188. Similar exercises can be performed for the remaining compressed entry delta pointers illustrated in FIG. 1A.

The compressed portion 102 includes a header 110. The header 110, in this particular example, includes four bytes of data. These four bytes of data provide information about how the compressed portion should be interpreted.

In the example illustrated, the first byte is a flag indicator 112, which in this example is a negative number. For example, this can be represented by the 0x80 hexadecimal encoding of the eight bits 10000000. This is the high byte of a four byte number, such that the entire four byte number appears negative. The flag pointer 112 can be used to indicate that some or all of the data following the header 110 is compressed data. While a negative number is used here, it should be appreciated that other codes or identifiers may be used to identify the beginning or existence of a compressed block of data. However, the use of a negative number allows for reduction of processing resources needed to identify a compressed portion of the list 100.

The second byte is an entries count indicator 114 which identifies the number of compressed delta pointers in the compressed portion 102. In the example illustrated, the second byte with the entries count indicator 114 has a value of 7. In this example, this is interpreted such that seven compressed delta pointers are included in the compressed portion 102, including the entries at 104, 106, 108, 122, 124, 126, 128, and 130. However, it should be noted that the compressed portion 102 actually includes eight entries including an uncompressed entry within the compressed portion as illustrated at 120. The usefulness of this uncompressed entry will be discussed in more detail below.

The third byte is a list compressed entry size indicator 116 which indicates the size of compressed entries (e.g. the delta pointer entries 104, 106, 108, 122, 124, 126, 128, and 130) in the compressed portion 102. In particular, the list compressed entry size indicator 116, in this example, indicates the number of bytes used by each of the delta pointers. In this example, each delta pointer entry is one byte in size. Other examples will be illustrated herein where the list compressed entry size indicator 116 can be used to indicate different fixed number of bytes for a compressed list delta pointer entry, a variable number of bytes for a compressed list delta pointer entry, or run length encoding (RLE) for list entries. These examples will be discussed in more detail below.

The fourth byte is a compressed block size indicator 118, which is a size indicator indicating the number of bytes in the compressed block 102. While in this example, the indicator 118 indicates the number of bytes directly, other embodiments may indicate the number of bytes by indicating the number of words or by indicating other information that conveys the size of the compressed block 102.

FIG. 1A. illustrates a beginning compressed block entry 120 stored in a four byte block in the compressed portion 102. In this example, the beginning compressed block entry 120 is not compressed as a delta a pointer, but is rather similar to the location numbers illustrated in the list 100. The beginning compressed block entry 120 points to a record in the data store indexed by the list 100.

FIG. 1A further illustrates a number of compressed list entries 104, 106, 108, 122, 124, 126 and 128. As described previously, these compressed list entries are delta entries which represent a change from the previous entry. Details of how this change is represented in the particular example illustrated in FIG. 1A are described above.

FIG. 1A further illustrates a filler entry 130 stored in a one byte entry of the compressed portion 102. The filler entry 130 is included in the compressed portion 102 so as to maintain an appropriate size of the compressed portion 102. In particular, it is desirable to maintain the compressed portion 102 at a size that is more optimal based on the native bus size of the computer system operating on the list 100. In the example illustrated in FIG. 1A, the native size of the bus of the computer system used to operate on the list 100 is a 64 bit bus. Thus, more optimal compressed portions such as compressed portion 102 will include some multiple of four bytes. In the present example, the compressed portion 102 has a multiplier of 4× (i.e. 4×4 bytes). By having the compressed portion 102 be more optimal with respect to the bus size, processing resources and time can be conserved by avoiding operations where start and end points of compressed blocks must be located because they do not fall on a natural native memory boundary. Notably, while the above example has been illustrated in the context of a binary computer, it should be appreciated that other embodiments may be implemented with other systems. For example, the principles described herein could be adapted to function with ternary, or higher number based systems. As alluded to above, embodiments may be adapted for other non-numeric based systems as well. Size optimizations could also be implemented based on the particular system in which and embodiment is adapted to be implemented Reference is now made a FIG. 1B which illustrates alternatives to the compressed block 102 illustrated in FIG. 1A. For example, FIG. 1B includes a compressed block 102A that may be substituted for the compressed block 102 in FIG. 1A. The compressed block 102A includes a list compressed entry size indicator 116A. In this example the list compressed entry size indicator 116A indicates that each of the compressed entries 132, 134, and 136, occupy two bytes of data in the compressed portion 102A. The compressed portion 102A further includes a filler portion 138 which also occupies two bytes of data.

Figure 1B:
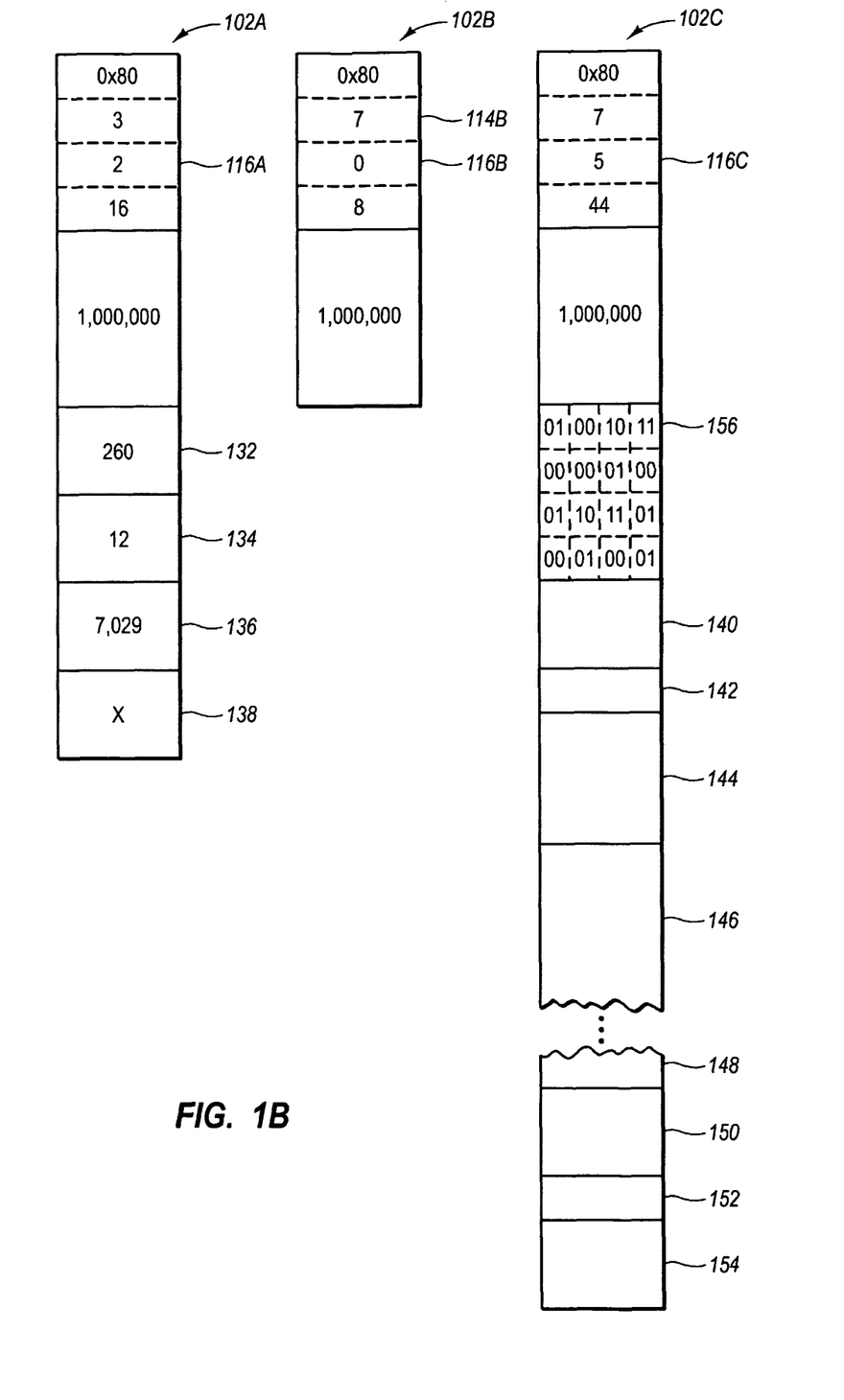
FIG. 1B illustrates a number of alternative compressed portions that my be implemented in the index entry illustrated in FIG. 1B.

FIG. 1B further illustrates another alternative compressed portion 102B. The compressed portion 102B is illustrative of an example where run length encoding may be used. In particular, the compressed portion 102B includes a list compressed entry size indicator 116B. In this example, the list entry size indicator has a value of 0. In this example, this particular value indicates that each of the compressed list entries has a delta value of 1, indicating an instance of run length encoding, and that the compressed list entries need not be included explicitly. Because each of the delta values has a value of 1, there is no need to explicitly include the compressed list entries explicitly in the compressed portion 102B. This allows for a further saving of storage space to implement the compressed portion 102B. Thus, the compressed portion 102B includes an explicit reference to 1,000,000, and by inference, due to the list compressed entry size indicator 116B with a value of 0 and the entries count indicator 114B with a value of 7, 1,000,001, 1,000,002, 1,000,003, 1,000,004, 1,000,005, 1,000,006, and 1,000,007. Notably, if the same list entries were included explicitly in an uncompressed portion of the list, they would require four bytes for each entry, for a total of 32 bytes. However, the compressed portion 102B only requires 8 bytes, which is a compression of 75%.

Another alternative compressed portion 102C is illustrated in FIG. 1B. The compressed portion 102C illustrates an example where compressed list entries, e.g. list entries 140, 142, 144, 146, 148, 150, 152, and 154, can be of varying sizes and are not fixed to a given size for a given compressed portion. In other words, each of the compressed list entries may occupy a different number of bytes than one or more of the other compressed entries in the same compressed portion 102C. In this example, the list compressed entry size indicator 116C has a value of 5 where the value of 5 can be interpreted to mean that compressed list entries are of a variable size. The value of 5 is beyond the fixed size indicators or an RLE indicator. In particular, the embodiment illustrated allows for RLE when the list compressed entry size indicator 116 has a value of 0, a fixed size of 1 byte when the list compressed entry size indicator 116 has a value of 1, a fixed size of 2 bytes when the list compressed entry size indicator 116 has a value of 2, a fixed size of 3 bytes when the list compressed entry size indicator 116 has a value of 32 a fixed size of 4 bytes when the list compressed entry size indicator 116 has a value of 4, and a variable number of bytes for each compressed entry when the list compressed entry size indicator 116 has a value of 5.

To allow for variable sizes to be implemented, the embodiment illustrated using the compressed portion 102C includes a differential indicator in the form of a variable size list 156 which includes a number of variable compressed entry size indicators. In this particular example, each variable compressed entry size indicator is a two bit binary number. If the variable compressed entry size indicator has a value of 00, than the corresponding compressed entry occupies one byte of space. If the variable compressed entry size indicator has a value of 01, then the corresponding compressed entry occupies two bytes of space. If the variable compressed entry size indicator has a value of 10, them the corresponding compressed entry occupies three bytes of space. If the variable compressed entry size indicator has a value of 11, then the corresponding compressed entry occupies of four bytes of space. As illustrated in the example in FIG. 1B for the compressed portion 102C, the first entry in the variable size list 156 has a value of 01. The corresponding compressed entry is compressed entry 140, which occupies two bytes of space. Further illustrating, the next entry in the variable sites list 156 has a value of 00, which indicates that the size of the compressed entry 142 occupies one byte of space. The next entry in the variable size list 156 has a value of 10, which indicates that the compressed entry 144 occupies three bytes of space.

Notably, some embodiments implement the variable size list 156 using an optimized size for the variable size list 156. In one embodiment, optimization may be based on selecting a variable size list of a size that correlates with a native memory size of a processor used to process the compressed portion 102C. For example, in the example illustrated for the compressed portion 102C, the variable size list 156 is four bytes in size. This may be an optimized size for a 32 or 64 bit processor. In particular, in binary examples, when the variable sites list 156 is selected to correspond to a native processor memory size, then the variable size list can be loaded directly into registers accessible by a processor. An operation can then be performed to read two bits, read the corresponding memory portions containing the corresponding compressed entries, and shift the register by two bits, which discards the previously read two bits. This process could be repeated for subsequent entries in the variable size list 156 to determine how many bytes of compressed data should be read for each compressed entry. This would facilitate an optimization in the number of processor instructions that would be needed to access a given compressed list delta pointer entry in the compressed portion 102C.

Notably, the preceding compression embodiments can be further enhanced by using the embodiments with searching algorithms that are particularly well suited to be used with lists including compressed portions implemented in a fashion as described herein. In particular, the preceding compression embodiments have been optimized to be used in conjunction with speed-up data structure searching as is described in U.S. patent application Ser. No. 11/847,688 titled Vortex searching, filed on Aug. 30, 2007, which is incorporated herein by reference in it entirety.

In particular, speed-up data structure searching may improve upon traditional indexing techniques by reducing the amount of searching and/or comparing that is performed to identify records with particular parameter patterns specified in a search. Note that when reference is made to searching a data store herein, searching of the data store may be performed by searching an index, without any actual comparison in the records of the data store. Eliminating the amount of searching can be accomplished in a number of different ways. For example the amount of searching performed can be reduced by selecting the order in which parameter patterns are searched for in a data store. Specifically, by searching first for parameter patterns which appear less or least frequently in the data store before searching for parameter patterns that are included more frequently in the data store, searching can be reduced by jumping over portions of the data store and eliminating those portions from being searched.

Parameter patterns include one or more elements, which may be specified for a particular search. For example, a parameter pattern may be a word, phrase, number, date, etc. Parameter patterns may also include patterns for other types of patterns such as image patterns, sound patterns, fingerprint patterns, voice patterns, etc. Other patterns may also be used within the scope of parameter patterns.

Additionally, some embodiments further optimize searching by using randomization techniques such as hashing of parameter patterns and indexing the hashes to index parameter patterns to create a more evenly distributed index which facilitates efficient index searching. Further still, some embodiments accomplish jumping over of portions of index entries by using speed-up data structures such as offset correlation entries to reduce the number of comparisons that need to be performed.

Further optimizations can be obtained by eliminating searches of the data store that are performed using a full text index by using an abbreviated index which may be implemented as a probabilistic indicator that parameter patterns might be found in a data store, and a certain indicator that searches or search terms will not be found in a data store. Additionally, optimizations may be obtained by eliminating entire queries such as a search including N parameter patterns by determining that parameters patterns or combinations of parameter patterns from the N parameter patterns are not found in any record of the data store. These optimizations will be discussed in more detail below.

In some embodiments described herein searching is made more efficient by reducing the number of records on which Boolean intersection techniques are applied. This may be accomplished by eliminating records from searching For example, consider the following index entries:

quick . . . 1, 9,999
red . . . 5, 9, 13, 500, 723, 9,999

Assume that a user specified in a query that these parameter patterns are to be found in the same record of the data store. In traditional search techniques, the following Boolean comparisons would need to be performed quick(1) AND red(5), quick(9,999) AND red(5), quick(9,999) AND red(9), quick(9,999) AND red(13), quick(9,999) AND red(500), quick(9,999) AND red(723), and quick(9,999) AND red(9,999), where the only intersection found is at quick(9,999) AND red(9,999).

However, using one embodiment described herein, the complexity and number of compare operations can be reduced in a search for intersection of records. For example, one or more of the comparisons including data store record identifiers for "red" including 5, 9, 13, 500, and 723 can be eliminated from comparisons to data store record identifier 9,999 for "quick."

In one embodiment, it is desirable to select a first parameter pattern to be searched for first. This first parameter pattern should be selected such that it occurs in the data store or an index of the data store less than at least one other parameter pattern specified in the query. Preferably, the first parameter pattern should be the least frequent occurring parameter pattern of all the parameter patterns specified in the query. In the present example, "quick" is selected as the first parameter pattern. Illustratively, the index may be searched for the first occurrence of the parameter pattern "quick." This occurs in record 1 as illustrated by the above the index. The index is then searched for the next parameter pattern. In the present example, "red" is the next parameter pattern. It is discovered by referencing the index that an occurrence of the parameter pattern "red" occurs in record 5. A comparison of the locations reveals that they are not the same, and thus, there is no intersection. Additionally, because record number 5 is after record number 1, the index is consulted to find the next occurrence of the parameter pattern "quick," which occurs at 9,999. At this point, a comparison may be performed to determine if it is beneficial to perform a jump over one or more data store record entries between 5 and 9,999. Because of the large number of data store records between 5 and 9,999, a decision is made to jump data store records. Various jump mechanisms can be used, as will be discussed further below. The jump mechanisms can jump records such that comparisons are performed again near or at the largest record. For example, data store records 9, 13, 500, 723 can be jumped such that the next compare is quick(9,999) AND red(9,999), which yields an intersection.

As alluded to previously, proper selection of the first searched parameter pattern may reduce the number of index accesses and Boolean operations. For example, in one embodiment, a parameter pattern that appears less in the index than other parameter patterns will be searched before searching for the other parameter patterns. Further, in some embodiments less common terms are always searched before more common terms.

Similarly other efficiencies may be obtained by searching parameter patterns that are the most evenly distributed across the data store or that have large gaps between occurrences. Notably, to obtain these efficiencies, there should be a balance between the amount of time saved by not performing comparisons and the amount of time needed to calculate the most optimal parameter pattern to search next. In some cases it may be more efficient to simply perform the comparisons rather than calculating the most efficient parameter pattern to search next.

Jumps may be accomplished by using a speed-up data structure that allows for skipping of a number of record comparisons may be implemented. One speedup structure is a multi-level bit reduction structure. An example of this structure is now illustrated. Assume that an example index is as follows:

quick . . . 1, 3, 7, 9, 11, 13, 15, 17, 19, 21, 23, 25, 27, 29, 31, 33, 35, 37
red . . . 2, 35

A speedup data structure for the index entry "quick" may be implemented. The speedup data structure is as follows:

| References: | 1, 3, 5, 7, | 9, 11, 13, 15, | 17, 19, 21, 23, | 25, 27, 29, 31, | 33, 35, 37 |
|---|---|---|---|---|---|
| Level 1: | 1, | 9, | 17, | 25, | 33[END] |
| Level 2: | 1, | | | | 33[END] |

Levels 1 and 2, in this embodiment, contain pointers to references in the base index entry based on a particular logical interval. For example, notice that Level 1 is based on an interval of 8. As will be shown later, this allows for a two bit shift to be performed to switch comparing from the reference list to Level 1. Similarly, Level 2 has an interval of 32, which allows for another two bit shift to shift comparison from Level 1 to Level 2. Notably, specifying an interval which allows for a level shift using 5 bits has proven to be more effective in obtaining speedups, as shifting from level to level can be expensive in terms of processing power. However, the 2 bit shift shown here is easier to illustrate and as such is used for example purposes. When using speed-up data structures and compressed references, reference is made by pointing to the beginning of a compressed block of references.

Illustrating now the functionality of the speedup data structure, to find an intersection between quick and red, the following comparisons are performed: red(2) AND quick(1), red(2) AND quick(3), quick(3) AND red(35), quick(5) AND red(35), and quick(7) AND red(35) in the data store reference list. None of these comparisons yield a true result because the reference list does not match. 9 is a boundary between the data store reference list and Level 1, as such, a shift may be made to Level 1 for further comparisons. The decision to shift to Level 1 may be made using any one of a number of different criteria. In one embodiment, the decision is made based on the magnitude of the difference between the record numbers being compared at the boundary. In this example, the magnitude is the difference between 35 and 9. In other embodiments, the shift may be made to a next level simply based on having reached a boundary. At Level 1, the comparisons quick(17) AND red(35) and quick(25) AND red(35). Again, no true results are obtained. 33 is a boundary, so comparisons may be switched to Level 2. At level 2, the comparison is quick(33) AND red(35) and the end of the list designator is encountered [END]. Yet once again, no true results are obtained. Moving comparisons back to Level 1, the end of the list designator is encountered, so comparisons are once again switched to the data store reference list. The comparisons are quick(33) AND red(35) and quick(35) AND red(35) in the reference list, where an intersection is found at 35.

Notably, when the preceding speed-up data structure is used with the compressed list 100, it may be advantageous for the upper levels, such as levels 1 and 2 illustrated above, to refer, at least in some instances, to beginning portions of compressed portions 102.

In another embodiment, an offset correlation table may be used when a very large number of references are included in an index entry. Assume for example that the index entry for "quick" includes a list of records including all odd numbered records from 1 to 10,000. The index entry for "red" includes an entry for record 9 and 9,999. In other words, the index includes entries are as follows:

quick . . . 1, 3, 7, . . . 9,995, 9,997, 9,999
red . . . 9, 9,999

While the speedup structure described above could provide some efficiencies by eliminating comparisons, even greater efficiencies could be realized by eliminating even more comparisons using an offset correlation table speedup data structure.

Figure 2:
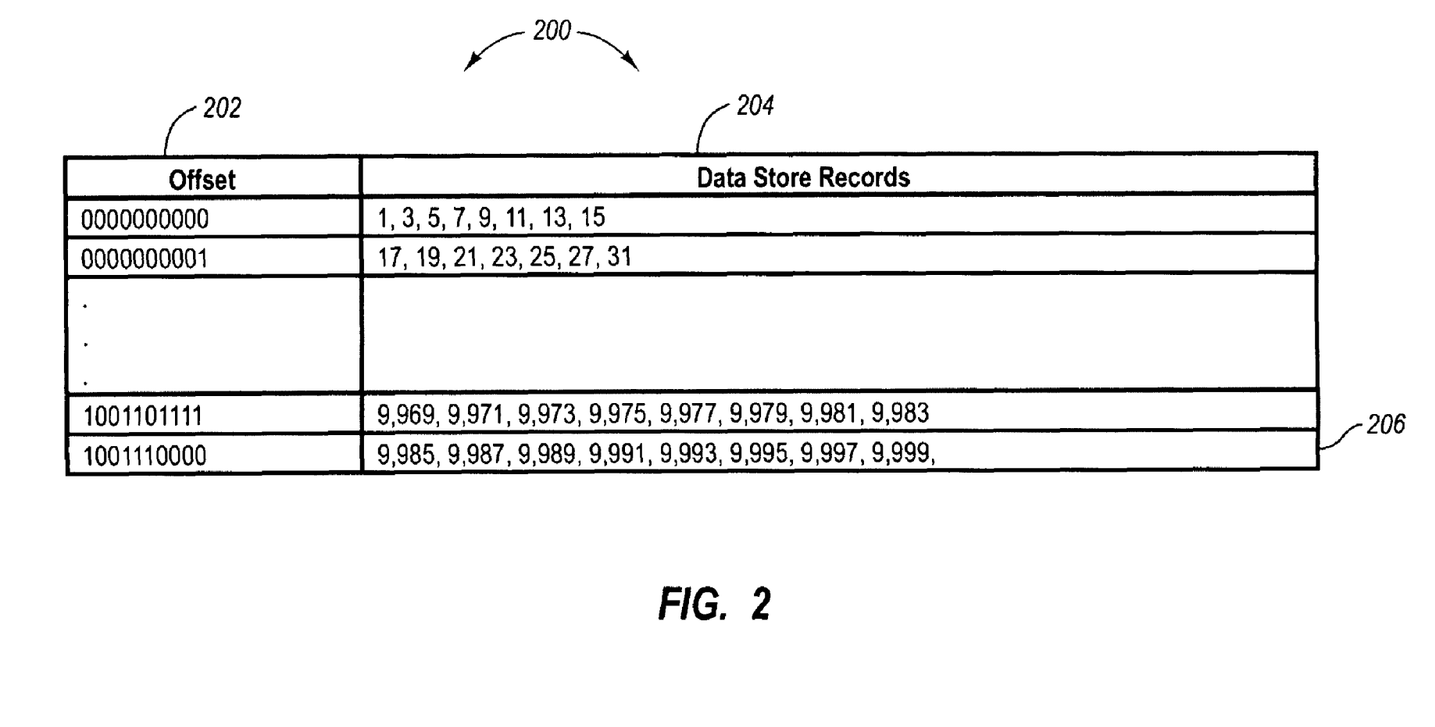
FIG. 2 illustrates an offset correlation table.

Referring now to FIG. 2, an offset-correlation table 200 for the index entry for "quick" is illustrated. The offset correlation table 200 includes two columns, namely an offset column 202 and a records column 204. The offset column 202 includes the top ten binary bits of a fourteen bit number. The records column 204 includes records corresponding to a given offset. Illustrating now the relationship between the offsets in the offset column 202 and the records in the records column 204, each offset in the offset table 202 is the top ten bits of a fourteen bit number representing the records in the corresponding records entry in the records column 204. For example, the binary representation of the number 17 is 00000000010001. The top ten bits of this number are 0000000001, which is the off-set for record number 17. Similarly, the binary representation of 9,999 is 10011100001111, of which the top ten bits are 1001110000, which is the off-set that corresponds to 9,999 in the offset-correlation table 200.

Illustrating now an example, from the index above, a comparison has been made at record 9 for quick and red. Examination of the entry for "red" shows that the next comparison should be at 9,999. Rather than comparisons taking place for all of the record entries from 9 to 9,999 for the parameter pattern "quick," the offset correlation table can be used to jump past a large number of the records for "quick" to reduce the number of comparisons. In particular, the offset correlation table 200 can be referenced by referencing the first 10 binary bits representing 9,999. This is the entry 1001110000 illustrated at 106 in FIG. 1. Comparisons can then be made at 9,985, 9,987, 9,989, 9,991, 9,993, 9,995, 9,997 and 9,999, where a match is found. Thus, using the offset correlation table, nearly 5,000 comparisons were avoided. Notably, as with other speedup data structures, the decision to use the offset correlation table may be automatic or based on some factor such as the magnitude of the difference between comparisons, the percentage of the overall index that can be skipped, or other calculated factors.

The size of the speedup table is often selected be an order of magnitude lower than the reference list size. If there are few references, then no speedup structure is needed. If there are 10,000,000 references in 15,000,000 compressed bytes, a target may be to compress blocks of 16 entries each. In some embodiments, this may be the biggest size for the speedup structure when and because a compressed block is always entered at the beginning of the block. If the average size for the speedup structure is, for example, 30 bytes, and there is a 4 byte offset correlation table entry to hop to it, then about 8:1 is the maximum size for an offset correlation table 200 for this reference list. The offset correlation table 200 can become smaller than that, especially when the reference list might be on flash drive or disk and there might be room for an offset correlation table 200 or other speedup structure in memory. In this case there might be a much higher ratio between offset correlation table size and the reference list. In some embodiments, it may be 256:1 or some similar ratio and still be a great help in making small disk reads in the file to get the right portions of the list rather than reading and processing the whole list from disk. Memory based systems will typically have a smaller ratio of offset correlation table to reference list size and disk based systems will have a larger ratio.

Embodiments herein may be further enhanced by using an abbreviated index, such as the abbreviated index described in U.S. patent application Ser. No. 11/681,673, titled "Abbreviated Index" and filed on Mar. 2, 2007, which is incorporated herein by reference in its entirety. As described in that application, the use of randomization and/or spreading techniques used for index entries, as well as the searching by elision, or recognizing when there is an absence of a parameter pattern in a data store to forgo further data store processing, also contribute to efficiencies. Further, templates including combinations of parameter patterns may be indexed in the abbreviated index such that entire templates may be eliminated from searching.

Abbreviated indexing techniques will now be explained. Referring now to FIG. 3, an abbreviated index 302 is illustrated, which in this example is a 32 bit binary number. The abbreviated index 302 is shown with an index field 304 and a value field 306. Notably, the index field 304 in this example is shown for convenience of explanation. The value field 306, in this example, includes the 32 bit binary number stored in physical memory. The index field 304 includes hexadecimal index representations of each of the elements of the 32 bit number represented in the value field 306.

FIG. 3 further illustrates a numerical representation table 308. The numerical representation table 308 includes a parameter patterns field 310, a numerical representation field 312, a last 8 bits field 314, a last 5 bits field 316, and a hex of the last 5 bits field 318.

The parameter patterns field 310 includes parameters and patterns of parameters on which operations can be performed. In this example, a data structure includes the text phrase "The quick red fox." In the example shown, combinations of individual words are represented as parameter patterns in the parameter patterns field 310. For example, "fox" is illustrated as a parameter pattern. "red" is illustrated as a second parameter pattern. "red fox" is illustrated as a parameter pattern. And so forth. The example shown here shows in the parameter patterns field 310 all possible combinations of individual words in the phrase "The quick red fox" when ordered in the original ordering.

It should be appreciated, however, that parameter patterns may also be created to represent different orderings and combinations. For example, other embodiments may include parameter patterns such as "fox quick red." This pattern with the terms in simple alphabetical order without function words may be used to perform searches when correct ordering of search terms is not necessarily needed or to increase the confidence that a particular set of search terms are present in a data store. Further still, other parameter patterns may be included as illustrated in other examples illustrated herein below. Other types of patterns that can be applied to the abbreviated index or other index embodiments include, but are not limited to synonyms, homonyms, term attributes, proximities, term order, frequency, location, partial or incomplete terms, customized descriptions, related terms, phonetic, syntactic or semantic linguistic descriptions and so forth.

In the example illustrated in FIG. 3, the parameter patterns field 310 represents search strings that may be performed to locate elements in a data store, such as a data store including the phrase "The quick red fox."

The numerical representation field 312 in this example includes a numerical representation of each of the parameter patterns in the parameter patterns field 310. The numerical representations may be generated in any suitable fashion. In this particular example the numerical representations are hash values of the parameter patterns. For example, a hash calculation may be performed for the parameter "fox." This hash calculation results in a number, which in this example is represented as a 64 bit hexadecimal number. Preferably, the hash calculation is performed using a good algorithm that results in a high percentage of unique numbers for calculations performed on different parameters and parameter patterns. For example, it is preferable that a hash calculation for "fox" results in a number that is different from the hash calculation for "red." The other fields in the numerical representation table 308 will be explained in more detail at a later point herein. Notably, other identifiers than hash numbers may be used. Hash numbers are simply one embodiment of identifiers. Numerous other identifiers may be used as well. While numerous hash value calculations are illustrated herein, they are simply one example used for ease of understanding by describing a specific embodiment.

Referring once again to the abbreviated index 302, each of the elements of the value field 306 represents a portion of a numerical representation 312 in the numerical representation table 308. Thus, the value field 306 contains a representation that a parameter pattern may be included in a set of parameters, such as a data store, based on the calculated hash for the parameter pattern. In this example, when a bit is set or as used herein "true," i.e. "1" in an element of the value field 306, this is an indication that a parameter pattern may be included within a set of parameters.

For effective results, the abbreviated index typically includes a number of elements that is equal to or greater than some multiple greater than 1 of the number of parameter patterns for a set of parameters. In the present example, 15 parameter patterns are included in the illustrated set of parameters. The abbreviated index 302 corresponding to the set of parameters therefore includes 32 elements (i.e. the 32 binary digits of the 32 bit binary number in the abbreviated index 302) which is a value greater than 2× of 15. Notably, the number of a multiplier (in this example 2) provides greater confidence that a parameter pattern is included in the set of parameters as the multiplier increases. For example, in the present 2× example, if a bit in the abbreviated index is set indicating that a parameter pattern may be included in the set of parameters, the confidence is about 50%. If a 64 bit binary number representing a 4× multiplier is used to represent the abbreviated index, confidence can be increased to about 75%. Similar increases in confidence can be achieved as the number of elements used to represent the abbreviated index is increased.

Notably, the examples above use a data structure for the abbreviated index 302 that is of a size that corresponds to numbers that can be represented by a set of binary bits. For example, a 2× setting of a four bit binary structure (up to 16 binary numbers) can be represented by a 32 bit data structure. A 2× setting of a 5 bit binary structure (up to 32 binary numbers) can be represented by a 64 bit data structure, and so forth. As noted, this example is a binary example. However, embodiments may be tailored to systems based on other number bases or other bases.

Now with particular emphasis on how the existence of parameter patterns are noted in the abbreviated index 302, note that FIG. 3 includes the last five bits of hash field 316. The last five bits of hash field represents the last five binary bits of the hexadecimal number in the numerical representation field 312. Five bits are selected because that is the number of binary bits needed to represent 32 unique binary numbers, the number of binary bits in the abbreviated index 302. Note that while the last five bits have been chosen in this example, embodiments are not limited to just the last bits. Any appropriate selection of bits can be used. In this example, so long as the same bits are used consistently to set bits in the abbreviated index 302, effective filtering can be performed.

For illustration purposes, the last 8 bits of the numerical representation in the numerical representation field 312 can be calculated by converting the last two hexadecimal numbers to binary numbers. For example, for the parameter pattern "fox" in the parameter pattern patterns field 310, a hash of 40b8636cf497235c is calculated as shown in the numerical representation field 312. The last two hexadecimal numbers of the hash are 5c. These numbers represent the 8 bit binary number 01011100 as shown in the last 8 bits of hash field 314. By truncating the three most significant bits, the five least significant bits remain which are 11100 as shown in the last 5 bits of hash field 316. For simplicity in explanation, the last 5 bits can then be converted back to a hexadecimal number, which is 1c as shown in the hex of the last 5 bits field 318.

Thus the bit indexed by 1c in the index field 304 is set in the value field of the abbreviated index 302. As illustrated, continuing this process for each of the parameter patterns in the parameter patterns field 310 results in the element in the value field 306 corresponding to the index numbers of 3, 5, 9, d, 11, 15, 16, 18, 1c, and 1f in the index field 304 of the abbreviated index 302 are set. Notably, the abbreviated index 302 includes a sampling of representations that can be maintained by the abbreviated index.

Before performing a full text search on, for example a data store, a check of the abbreviated index 302 can be made for the parameter pattern. This can be done by hashing the parameter pattern, and in this case, checking the last 5 bits of the hash as an identifier for the parameter pattern to see if the identifier appears in the abbreviated index 302. If it does not appear in the abbreviated index, it can be determined with 100% accuracy that the particular parameter pattern does not exist in the data store front-ended by the abbreviated index 302. However, if the identifier is in the abbreviated index 302 it is known, in this example, that there is about a 50% chance that the parameter pattern appears in the data store. This confidence can be increased by searching of related parameter patterns. For example, if the search term entered by a user is "quick red fox," confidence can be increased by checking the abbreviated index 302 for indicators for "quick," "quick red," "red fox," "red," etc.

Attention is directed once again to subject matter where an identifier such as a hash identifier, where a hash identifier is any identifier associated with a parameter pattern, can be used as an index entry in place of usual index entries, such as words or phrases. For example, FIG. 4A illustrates a linked list hash index 400 which indexes parameter patterns by indexing sorted hash keys. FIG. 4A includes a hash identifier column 402. The hash identifier column 402 includes a number of hash keys. Each of the hash keys in the hash identifier column 402 is the result of performing a hashing algorithm on a parameter pattern that is to be indexed. The hash identifiers are organized in an ascending numerical order so as to accomplish efficient entry into the hash index 400 as will be explained in more detail in conjunction with the explanation of FIG. 5. The hash index 400 includes an index record address column 404. The index record address may be a physical memory address where each entry in the index is stored.

Figure 4:
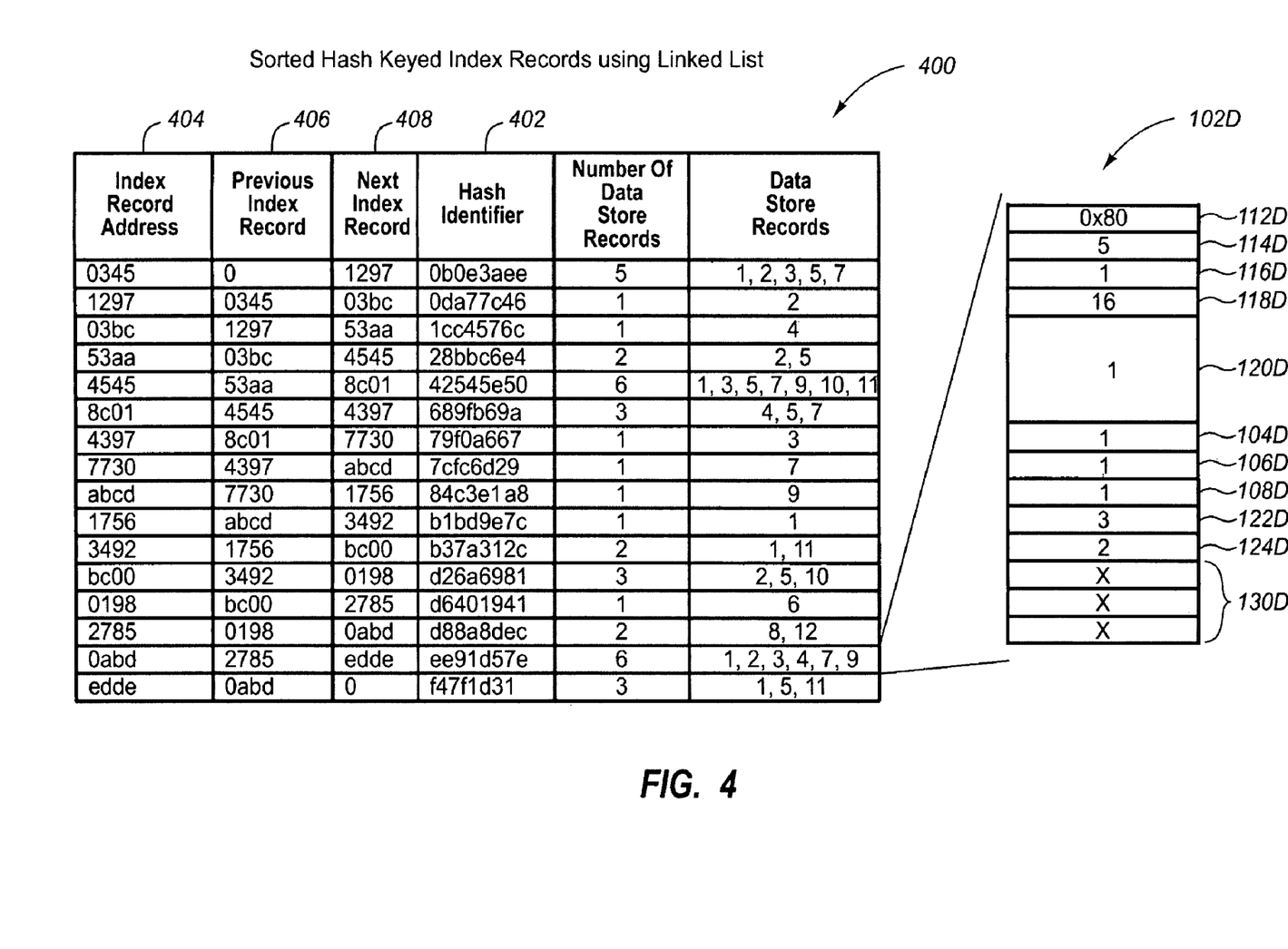
FIG. 4 illustrates a sorted hash keyed index.

Illustrating now a concrete example for illustration purposes only, assume that a system is to index the parameter pattern "quick." Assume further, that a particular hashing algorithm when applied to the parameter pattern "quick" yields a hash identifier of 0b0e3aee. This hash identifier may be indicated in an abbreviated index such as the abbreviated index 402 shown in FIG. 4. The hash identifier may also be stored in a linked list index 400 where the hash identifier is correlated with an index record address such as the ones illustrated in the index record address column 404. When a data store is indexed to facilitate searching, instead of indexing the term "quick", the hash identifier 0b0e3aee will be indexed. Thus as illustrated in FIG. 4A, an index record located at 0345 includes references to five data store records in the data store being indexed including record numbers 1, 2, 3, 5 and 7.

Similarly, when an index is referenced to identify references to records in the data store which include a particular parameter pattern, rather than searching the index for the parameter pattern, the parameter pattern specified in a search is hashed using the hashing algorithm used to create the index of hash identifiers, yielding a search hash identifier, after which the linked list index 400 is searched for the search hash identifier. Once the search hash identifier is identified in the linked list index 400, an index record address corresponding to the hash identifier is accessed to identify data store records including the parameter patterns specified in the search. Using hash identifiers instead of actual parameter patterns or search terms provides a number of advantages. For example, if a good hash algorithm is used which results in a highly uniform distribution of hash values across a range of hash values, efficiencies can be obtained by spreading dense areas of an index into less dense areas of the index.

The linked list index may be compressed using the compression algorithms described previously herein. For example, the entry 0abd in the linked list index 400 may be compressed as illustrated at the compressed portion 102D rather than having each of the entries expressed directly. The compressed portion 102D includes a flag indicator 112D indicating that 102D is a compressed portion. The compressed portion 102D further includes a entries count indicator 114D which indicates the number of compressed entries in the compressed portion. There are five compressed entries including delta pointers 104D, 106D, 108D, 122D, and 124D. The compressed portion 102D further includes a list compressed entry size indicator 116D, which indicates that each of the delta pointers is 1 byte in size. The compressed portion 102D further includes a compressed block size indicator 118D, which indicates that the compressed portion 102D is 16 bytes in length. The compressed portion 102D further includes a beginning compressed block entry 120D, which although not compressed itself, is the first entry used for interpreting the compressed delta pointers. The entry 120D represents the data store records entry 1 for 0abd. The delta pointers 104D, 106D, 108D, 122D, and 124D, each represent compressed entries for the data store record entries 2, 3, 4, 7, and 9 respectively. Finally, the compressed portion 102D includes a filler entry 130D that is 3 bytes long so as to make the compressed portion a total of 16 bytes.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 5:
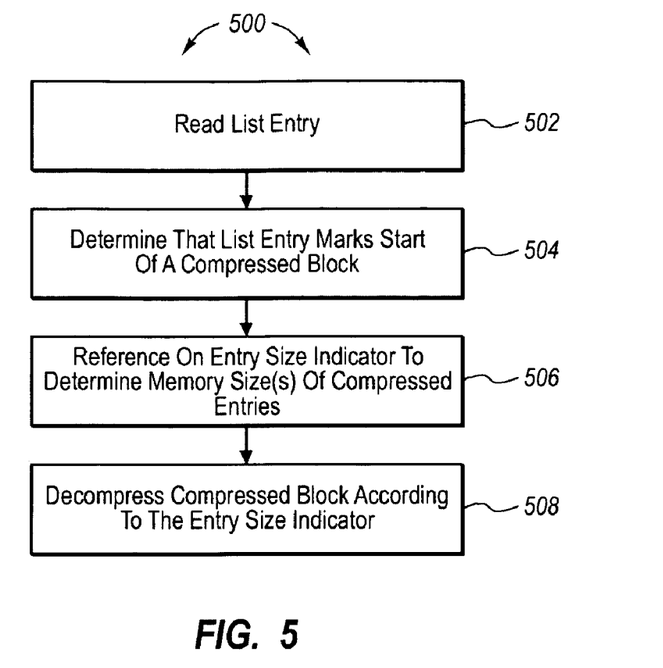
FIG. 5 illustrates a method of decompressing a compressed block.

A method 500 is illustrated in FIG. 5. The method may be practiced in a computing environment including one or more index lists. At least one of the one or more index lists includes at least a portion of the list that is compressed. The method 500 includes acts for reading portions of a compressed index list. The compressed index list includes one or more compressed blocks compressed using a delta compression algorithm including a number of delta pointers. Each of the delta pointers point to data store entries by reference to a difference from a reference in a previous entry in the list. For example, as illustrated in FIG. 1A, delta pointer 104 points to a data store entry 1,000,010 by referencing a difference of 10, the difference between the entry 1,000,000 illustrated at 120, and the data store entry 1,000,010.

The method 500 includes reading an entry from a list (act 502). Illustrating now an example of this act from the example illustrated in FIG. 1A, a computing system may read an entry from a list, such as reading the flag indicator 112 from the list 100.

The method 500 further includes determining that the entry indicates the start of a compressed block of the list (act 502). As is illustrated in FIG. 1A, determining that the entry indicates the start of a compressed block of the list may include determining that the entry is a negative number. Specifically, in the example illustrated in FIG. 1A, the flag indicator entry 112 is a negative number. Other indicators may alternatively be used, such as other flags, set or unset bits, etc.

The method 500 further illustrates referencing an entry size indicator to determine memory sizes of compressed entries (act 504). The entry size indicator is configured to indicate a memory storage size for one or more delta pointer entries. The entry size indicator supports indications for all of fixed storage sizes, variable storage sizes, and run length encoding. For example, in the example illustrated above in FIGS. 1A and 1B, the list entry size indicator 116 may have any value between 0 and 5. Note that while this example has 6 subdivisions (0-5), other embodiments may include more or less as appropriate for the system or design. A list entry size indicator with a value of 0 indicates that the compressed portion is compressed using RLE. Using RLE, each individual list delta pointer entry occupies 0 bytes of data. As noted previously, RLE indicates that all entries in a run are included in a list implicitly rather than explicitly. A list entry size indicator with a value of 1 indicates that each individual list delta pointer entry occupies 1 byte of data, and can therefore include a delta value up to 255. A list entry size indicator with a value of 2 indicates that each individual list delta pointer entry occupies 2 bytes of data and can thus include a delta value up to 65,535. A list entry size indicator with a value of 3 indicates that each individual list delta pointer entry occupies 3 bytes of data and can thus include a delta value up to 16,777,215. A list entry size indicator with a value of 4 indicates that each individual list delta pointer entry occupies 4 bytes of data and can thus include a delta value up to 4,294,967,295. A list entry size indicator with a value of 5 indicates that the individual list delta pointers entries do not necessarily share the same size, but rather can be of a variable size. This embodiment will be discussed in more detail below.

The method 500 further includes decompressing the compressed block of the list according to the entry size indicator (act 506). For example, when the list entry size indicator has a value of 1, single bytes are read to ascertain the value stored therein, and the values are added to a record value represented by a previous list entry. This may be by addition to an uncompressed entry or a compressed list delta pointer entry. In the examples illustrated above, the entry illustrated at 104 is decompressed by adding 10 to 1,000,000; the entry 106 is decompressed by adding 49 to 1,000,010; the entry 108 is decompressed by adding 129 to 1,000,059, etc.

As noted previously, embodiments of the method 500 may be practiced where the entry size indicator includes a variable storage size indicator. In this case, decompressing the compressed block of the list according to the delta indicator includes additional acts. One additional act includes referencing a portion of a differential indicator. The differential indicator is divided into a number of portions. At least some of the portions each correspond to a compressed entry in the compressed block. Each of the portions that corresponds to a compressed entry in the compressed block indicates a memory size of a compressed entry. An example is illustrated in FIG. 1B. In FIG. 1B, the differential indicator is the variable size list 156. In this example, the portions of the differential indicator are the individual variable compressed entry size indicators. As described above, the first two bit portion 01 corresponds to the two byte entry 140, the second two bit portion 00 corresponds to the 1 byte entry 142, the third two bit portion 10 corresponds to the three byte entry 144, etc.

For embodiments where the entry size indicator includes a variable storage size indicator, the method 500 may further include the additional act of reading a compressed entry by reading a memory entry of the indicated memory size of the compressed entry. In the example illustrated, if the portion has a value of 00, one byte is read. If the portion has a value of 01, two bytes are read. If the portion has a value of 10, three bytes are read. If the portion has a value of 11, four bytes are read. Other embodiments may be implemented, and the preceding is only one example. For example, more or less bits may be used in the indicator, and the bits may represent different numbers of bytes, words, nibbles, or other memory sizes.

For embodiments where the entry size indicator includes a variable storage size indicator, the method 500 may further include repeating referencing a portion of a differential indicator and reading a compressed entry by reading a memory entry of the indicated memory size of the compressed entry for subsequent portions and subsequent corresponding compressed entries. Examples of this will be illustrated more fully in conjunction with the description of FIG. 6.

The method 500 may be practiced where the differential indicator is sized to correspond to a native memory bus size of a processor executing portions of the method. As described for the embodiments above, the differential indicator may be sized to correspond to a native bus size such that the differential indicator may be read into processor registers. This allows reading of the portions of the differential indicator to be accomplished by register reads and bit shifting as will be explained in more detail below in conjunction with the description of FIG. 6.

In some embodiments, it may be beneficial to perform the method 500 on compressed blocks that are limited in size. In particular, if it is important to maintain fast speeds when decompressing, limiting the size of the compressed block limits the amount of processing that needs to be performed for decompressing some portions of the compressed block. For example, in one embodiment, the method 500 may be performed where compressed blocks in the list include 64 reference entries or less.

The method 500 may be practiced where reading an entry from a list is performed in response to reading an entry from an offset correlation table. As illustrated above, an offset correlation table may point to an entry in a list. The entry may be the indication of the beginning of a compressed block. Similarly, the method 500 may be practiced where reading an entry from a list is performed in response to following a pointer from a speed-up data structure. The speed-up data structure allowing for skipping of entries in the list. Examples of some embodiments illustrating this skipping are shown above.

The method 500 may further be practiced where the compressed portion includes a sufficient number of filler entries such that the compressed portion begins and ends at native memory boundaries. In particular, in one embodiment, this may be accomplished by causing the compressed portion to be a whole integer multiple of a native memory bus size of a processor executing portions of the method. For example, in the example illustrated in FIG. 1A, a filler portion 130 is included in the compressed portion 102 to cause the compressed portion to be 16 bytes long. If the example illustrated in FIG. 1A were implemented on a system using a 32 bit bus, then the multiplier is 4. If the example illustrate in FIG. 1A were implemented on a system using a 64 bit bus, then the multiplier is 2.

Figure 6:
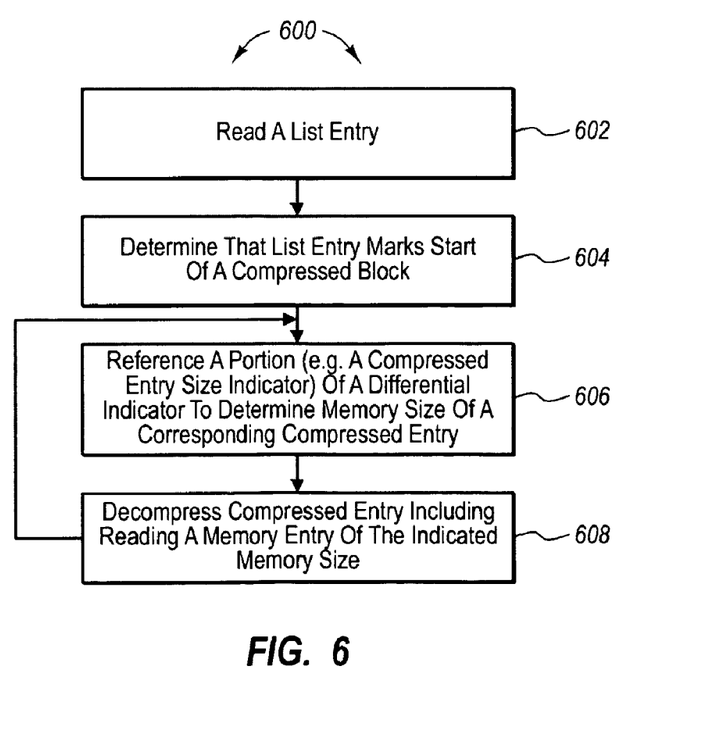
FIG. 6 illustrates another method of decompressing a compressed block.

Another embodiment is illustrated in FIG. 6. FIG. 6 illustrates a method 600, which may be practiced, for example, in a computing environment including one or more index lists. At least one of the one or more index lists includes at least a portion of the list that is compressed. The method 600 includes acts for reading portions of a compressed index list. The method 600 includes reading an entry from a list (act 602). An example of this can be illustrated using FIG. 1A which illustrates where a flag indicator 112 may be read.

The method 600 further includes determining that the entry indicates the start of a compressed block of the list (act 604). In the examples illustrated in FIG. 1A, this is accomplished by reading a negative number. The compressed block is compressed using a delta compression algorithm including a number of delta pointers. Each of the delta pointers points to data store entries by reference to a difference from a reference in a previous entry in the list.

The method 600 further includes referencing a portion of a differential indicator (act 606). The differential indicator is divided into a number of portions. At least some of the portions each correspond to a compressed entry in the compressed block. Each of the portions that correspond to a compressed entry in the compressed block indicates a memory size of a compressed entry. As illustrated previously, an example of this functionality is shown in FIG. 1B where the variable size list 156 includes a number of variable compressed entry size indicators.

The method 600 further includes decomposing a compressed entry by reading a memory entry of the indicated memory size of the compressed entry (act 608). For example reference to the first entry 01 in the variable list 156 causes two bytes, namely the two bytes indicated at 140 to be read.

Acts 606 and 608 are repeated for subsequent portions and subsequent corresponding compressed entries. In one embodiment, this may be accomplished using registers and memory pointers. For example, the variable size list 156 may be loaded into a register. A processor could be configured to read two bits (e.g. the two most significant or least significant bits). After two bits are read a determination is made based on the two bits how many bytes to read. A memory pointer may be stored to mark where the bytes should be read from. For example, a memory pointer may point to a memory address that begins at the entry 140. The number of bytes specified is read and the memory pointer moved to the beginning of the next unread byte. The variable size list 156, as stored in the register, could be shifted by two bits, and the next two bits (now the most significant or least significant bits as appropriate) could be read to determine how many more bytes, beginning from the newly moved pointer, should be read.

Embodiments of the present invention may comprise or utilize a special purpose or general-purpose computer including computer hardware. For example, embodiments described previously may be implemented using computing system comprising appropriate hardware and/or software including processors, memory, storage, operating systems, application software or other hardware or software. Additionally components may be implemented on each their own separate stand-alone computer system including individualized hardware where the machines are interconnected through network communication channels or other communication channels. Alternatively, components may be implemented on a common shared computer system, where the machines share resources, such as processor resources, memory resources, storage resources, or other resources.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by one or more processors for accessing an index list which stores pointers to records in a data store, wherein some of the pointers in the index list are compressed, the method comprising:
   reading a first entry in the index list, the first entry comprising a first pointer representing an address within a data store where a first record is located, the first pointer having a first size;
   reading a second entry in the index list, the second entry comprising a header of a compressed portion of the index list, the compressed portion including a plurality of delta pointers that each represent an address within the data store where a corresponding record is located, each delta pointer having a size that is smaller than the first size, and wherein the header includes a size indicator that, when set to one of a plurality of values, defines the size of each delta pointer within the compressed portion;
   determining the location of a third entry comprising a first delta pointer in the compressed portion of the index list by calculating an offset from a base address of the compressed portion based on the size of the delta pointers as defined by the size indicator; and
   reading the third entry by accessing the index list at the determined location.

2. The method of claim 1, wherein to the compressed portion includes 64 delta pointers or less.

3. The method of claim 1, wherein the size indicator, when set to a first specified value, defines that the size of each delta pointer within the compressed portion is variable, and wherein determining the location of a third entry comprising a first delta pointer in the compressed portion of the index list by calculating an offset from a base address of the compressed portion based on the size of the delta pointers as defined by the size indicator further comprises:
   accessing a variable size list within the compressed portion to identify one or more variable compressed entry size indicators that each define the size of a corresponding delta pointer that precedes the first delta pointer in the compressed portion; and
   calculating an offset from the base address of the compressed portion based on the size of the one or more corresponding delta pointers as defined by the corresponding one or more variable compressed entry size indicators.

4. The method of claim 3, wherein the variable size list is sized to correspond to a native memory bus size of a processor executing portions of the method.

5. The method of claim 3, wherein each variable compressed entry size indicator has an equal number of bits.

6. The method of claim 1, wherein the size indicator, when set to a second specified value, defines that each delta pointer within the compressed portion has been run length encoded.

7. The method of claim 1, wherein determining the location of the third entry is performed in response to following a pointer from a speed-up data structure, the speed-up data structure allowing for skipping of entries in the index list.

8. The method of claim 1, wherein the header of the compressed portion commences with an entry representing a negative number to identify that the compressed portion follows the entry representing the negative number within the index list.

9. The method of claim 1, wherein the compressed portion comprises a sufficient number of filler entries such that the compressed portion begins and ends at native memory boundaries.

10. The method of claim 9, wherein the compressed portion is a whole integer multiple of a native memory bus size of a processor executing portions of the method.

11. The method of claim 1, wherein determining the location of the third entry further comprises accessing an offset correlation table which defines an offset for each of a plurality of groupings of delta pointers in the compressed portion, each delta pointer in a grouping sharing the same offset with other delta pointers in the same grouping, the offset of a grouping comprising a number of bits at the beginning of each delta pointer in the grouping.

12. The method of claim 3, wherein calculating an offset from the base address of the compressed portion based on the size of the one or more corresponding delta pointers as defined by the corresponding one or more variable compressed entry size indicators comprises shifting an address of a previous delta pointer in the compressed portion by a number of bits as defined by the one or more variable compressed entry size indicators.

13. One or more physical storage media storing computer executable instructions which when executed by one or more processors perform a method for accessing an index list which stores pointers to records in a data store, wherein some of the pointers in the index list are compressed, the method comprising:
   reading a first entry in the index list, the first entry comprising a first pointer representing an address within a data store where a first record is located, the first pointer having a first size;
   reading a second entry in the index list, the second entry comprising a header of a compressed portion of the index list, the compressed portion including a plurality of delta pointers that each represent an address within the data store where a corresponding record is located, each delta pointer having a size that is smaller than the first size, and wherein the header includes a size indicator that, when set to one of a plurality of values, defines the size of each delta pointer within the compressed portion;
   determining the location of a third entry comprising a first delta pointer in the compressed portion of the index list by calculating an offset from a base address of the compressed portion based on the size of the delta pointers as defined by the size indicator; and
   reading the third entry by accessing the index list at the determined location.

14. The computer storage media of claim 13, wherein the size indicator, when set to a first specified value, defines that the size of each delta pointer within the compressed portion is variable, and wherein determining the location of a third entry comprising a first delta pointer in the compressed portion of the index list by calculating an offset from a base address of the compressed portion based on the size of the delta pointers as defined by the size indicator further comprises:
   accessing a variable size list within the compressed portion to identify one or more variable compressed entry size indicators that each define the size of a corresponding delta pointer that precedes the first delta pointer in the compressed portion; and
   calculating an offset from the base address of the compressed portion based on the size of the one or more corresponding delta pointers as defined by the corresponding one or more variable compressed entry size indicators.

15. One or more physical storage media which store a data structure, the data structure comprising one or more index lists, wherein at least one of the one or more index lists comprises:
    one or more non-compressed pointers that each represent an address within a data store where a corresponding record is located, each non-compressed pointer having a first size;
    a compressed portion comprising:
        a header that includes a size indicator that, when set to one of a plurality of values, defines the size of each delta pointer within the compressed portion; and
        a plurality of delta pointers that each represent an address within the data store where a corresponding record is located, each delta pointer having a size that is smaller than the first size, wherein each delta pointer defines an offset from an address of a previous pointer in the compressed portion.

16. The computer readable medium of claim 15, wherein the size indicator, when set to a first specified value, defines that the plurality of delta pointers of the compressed portion are compressed using run-length encoding, and wherein the delta pointers are included in the compressed portion implicitly based on the run-length encoding.

17. The computer readable medium of claim 15, wherein the size indicator, when set to a second specified value, defines that the size of each delta pointer within the compressed portion is variable, and wherein the compressed portion further comprises a variable size list that defines the size of each of the plurality of delta pointers.

* * * * *